Patented Sept. 9, 1924.

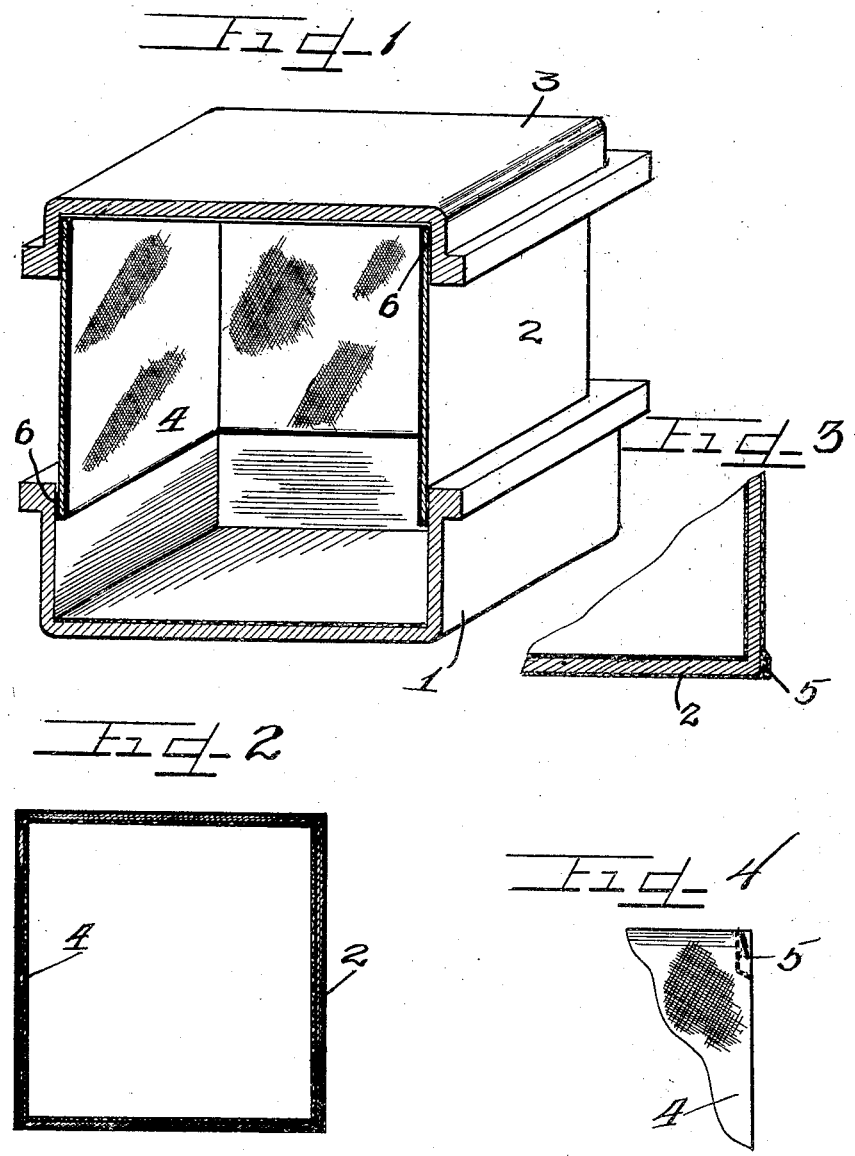

1,507,655

UNITED STATES PATENT OFFICE.

WINFIELD A. AUSTIN, OF GREEN BAY, WISCONSIN.

CHEESE BANDAGE.

Application filed November 12, 1923. Serial No. 674,151.

*To all whom it may concern:*

Be it known that I, WINFIELD A. AUSTIN, a citizen of the United States, and a resident of the city of Green Bay, in the county of Brown and State of Wisconsin, have invented certain new and useful Improvements in a Cheese Bandage; and I do hereby declare that the following is a full, clear, and exact description of the same, reference being had to the accompanying drawings, and to the numerals of reference marked thereon, which form a part of this specification.

This invention relates to a cheese bandage which is adapted to be placed in a polygonal cheese hoop during the operation of pressing the curd.

These bandages, which consist of some pliable material as cheese cloth, are usually folded over the top and bottom edges of the polygonal cheese hoop. This folding process stretches the bandage across the corners of the hoop whereby the cheese formed in such a bandage will have rounded corners so that the corner pieces will not be of proper weight after being cut.

It is an object of this invention to overcome the above noted objections in the provision of a bandage having upper and lower contracted portions which are adapted to be folded over the upper and lower edges of the hoop, the bandage between said contracted portions being put under very little, if any, tension so as to be allowed to conform to the corners of the hoop.

This invention comprises the novel structure and combinations of elements hereinafter described and more particularly pointed out and defined in the appended claims.

In the accompanying drawings, which illustrate a preferred embodiment of this invention, and in which similar reference numerals refer to similar features in the different views:

Figure 1 is a vertical section through a cheese mould.

Figure 2 is a horizontal section through the cheese hoop.

Figure 3 is an enlarged fragmentary sectional view of the cheese hoop showing the bandage folded thereover.

Figure 4 is a fragmentary plan view of a contracted portion of the cheese bandage.

As shown on the drawings:

In referring to the drawings, there is illustrated a stationary mould member 1 which is of polygonal form and open at its upper end and a movable mould member comprising the usual polygonal hoop 2 which telescopes within the stationary mould member and the cover 3 which fits down over the upper end of the hoop 2. This form of mould or press is merely illustrative and does not involve any part of this invention except in so far as it may co-operate therewith.

The subject matter of this invention is primarily directed to the bandage that lines the interior of the hoop 2 during the pressing or moulding of the curd into cheese. This bandage comprises a loop of some suitable pliable material 4 which may be the well-known cheese cloth. It is made by taking a piece of cloth of proper dimensions and sewing the ends together to form a loop of such a size as to amply fit the interior contour of the polygonal hoop 2 and of sufficient height to overlap both ends of the hoop. According to this invention, the upper and lower, or in other words the open, margins of this loop are controlled by a plurality of tucks 5 which are preferably formed so as to come at the corners of the hoop, as shown in Fig. 3, with the seam of the loop at a corner. These tucks 5 preferably extend a distance that is substantially equal to the exterior folded portions 6 of the loop when positioned within the cheese hoop.

In applying such a loop of cloth within the cheese hoop 2, it is positioned therein and the tucked margins 6 are folded over the upper and lower edges of the hoop. The hoop may then be inserted in the lower mould, the curd poured into the hoop and the cover 3 clamped down upon the hoop and over the tucked margin of the cheese bandage. There will accordingly be no tension imparted to the loop of cloth within the cheese hoop so that the same may readily conform to the interior contour of the polygonal hoop and allow the corners of the hoop to be filled.

It is apparent that this invention overcomes a serious defect or objection in a very simple way, making it merely necessary to produce a loop of cloth of proper size and tucking in the upper and lower margins thereof.

According to this invention, a full size cheese is manufactured that is thoroughly protected by the bandage or loop, and wherein the objectionable feature of round corners on a square cheese is entirely eliminated.

I am aware that numerous details of construction may be varied through a wide range wtihout departing from the principles of this invention, and I therefore do not purpose limiting the patent granted otherwise than necessitated by the prior art.

I claim as my invention:

1. In a cheese mould, a hoop, a cheese bandage therein comprising a loop of cloth having its upper and lower margins contracted and folded over the upper and lower edges of said hoop for the purpose set forth.

2. A cheese bandage comprising a loop of pliable material having its margins contracted.

3. A cheese bandage comprising a loop of pliable material having a plurality of tucks adjacent its margins for contracting the open ends thereof for the purpose set forth.

4. The combination with a polygonal cheese hoop, of a cheese bandage comprising a loop of pliable material fitting within said hoop, and having margins tucked at the corners of said hoop folded thereover.

In testimony whereof I have hereunto subscribed my name in the presence of two subscribing witnesses.

WINFIELD A. AUSTIN.

Witnesses:
CARLTON HILL,
OSCAR HARTMANN.